United States Patent Office 3,647,748
Patented Mar. 7, 1972

3,647,748
STABILIZED VINYL HALIDE RESIN COMPOSITIONS
John W. Brook, Plainfield, N.J., and Samuel Hoch, Brooklyn, N.Y., assignors to Tenneco Chemicals, Inc.
No Drawing. Filed Feb. 19, 1969, Ser. No. 800,750
Int. Cl. C08f 45/58, 45/62
U.S. Cl. 260—45.75
23 Claims

ABSTRACT OF THE DISCLOSURE

Vinyl halide resin compositions that contain a stabilizer system comprising an organotin carboxylate, an organic disulfide or polysulfide, and, optionally, a small amount of thiodipropionic acid, and thiodipropionate ester, and/or an organic phosphite have excellent processing characteristics, excellent heat and light stability, and other valuable properties.

---

This invention relates to stabilizer systems for vinyl halide resins and to resinous compositions stabilized therewith. More particularly, it relates to rigid polyvinyl chloride compositions that contain a stabilizer system comprising an organotin carboxylate, an organic disulfide or polysulfide, and, optionally, a small amount of thiodipropionic acid, a thiodipropionate ester, and/or an organic phosphite.

It is well known that vinyl halide resins undergo undesirable changes when they are exposed to heat and to light and that these changes lead to discoloration and to deterioration of the mechanical properties of the compositions. Since elevated temperatures are required for the processing of these resins and since they are exposed to light when they are subsequently used, it is necessary to incorporate in vinyl halide resin compositions stabilizers that will inhibit or prevent their deterioration when they are exposed to heat and to light. A large number of compounds and combinations of compounds have been proposed as stabilizers for vinyl halide resin compositions, but none has proven to be entirely satisfactory for this purpose. Many organotin compounds, for example, are excellent heat stabilizers for vinyl halide resins, but they are not effective in protecting the compositions against deterioration resulting from exposure to ultraviolet and other radiation.

In accordance with this invention, it has been found that vinyl halide resin compositions that have excellent processing characteristics, excellent heat and light stability, good color, color retention, and clarity, and other valuable properties can be obtained by incorporating in the compositions a stabilizer system that contains a major amount of an organotin carboxylate, a minor amount of an organic disulfide or polysulfide, and, optionally, a small amount of thiodipropionic acid, a thiodipropionate ester, and/or an organic phosphite.

The organotin carboxylates that may be present in the stabilizer systems of this invention have the structural formula

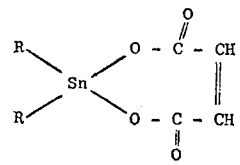

or the structural formula

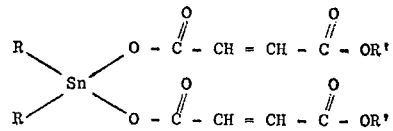

wherein each R represents an alkyl group having from 4 to 8 carbon atoms or a phenyl group and each R' represents an alkyl group having from 1 to 18 carbon atoms, an alkenyl or hydroxyalkenyl group having from 4 to 18 carbon atoms, a cycloaliphatic group, an alkaryl group, an aralkyl group, or a phenyl group. Illustrative of these organotin carboxylates are the following: dibutyltin maleate, dibutyltin bis(monomethyl maleate), dibutyltin bis(monohexyl maleate), dihexyltin bis(monoisooctyl maleate), dioctyltin bis(monostearyl maleate), dioctyltin bis(monobutenyl maleate), diphenyltin bis(monooleyl maleate), dioctyltin bis(monoricinoleyl maleate), diphenyltin bis(monocycohexyl maleate), diphenyltin bis(monobenzyl maleate), butylhexyltin bis(mono-tert.butylbenzyl maleate), dibutyltin bis(monophenyl maleate), and the like and mixtures thereof.

The organic sulfides that can be used as a component of the novel stabilizers have the structural formula

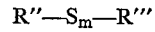

wherein m represents 2 or a higher number and preferably represents a number in the range of 2 to 10 and R" and R''' each represents an alkyl or hydroxyalkyl group having from 2 to 18 carbon atoms, an alkenyl group, an aralkyl group or a phenyl group. Among the useful sulfides are the following: diethyl disulfide, bis(hydroxyethyl) disulfide, dihexyl disulfide, hexyl octyl disulfide, dilauryl disulfide, distearyl disulfide, lauryl stearyl disulfide, bis(hydroxystearyl) disulfide, dibenzyl disulfide, diphenyl disulfide, dimethyllyl disulfide, dibutyl polysulfide, dioctyl polysulfide, octyl decyl polysulfide, distearyl polysulfide, diphenyl polysulfide, dibenzyl polysulfide, decyl phenyl polysulfide, and the like and mixtures thereof.

The stabilizer systems of this invention generally contain about 65 percent to 95 percent by weight of at least one of the aforementioned organotin carboxylates and about 5 percent to 35 percent by weight of at least one of the aforementioned organic disulfides and polysulfides. Particularly advantageous results have been obtained when the stabilizer system contained 85 percent to 95 percent by weight of an organotin carboxylate and 5 percent to 15 percent by weight of an organic disulfide or polysulfide.

The heat and light stability, color, clarity, and other properties of the stabilized vinyl halide resin compositions can be further enhanced by substituting for a portion of the organic disulfide or polysulfide either thiodipropionic acid, a thiodipropionate ester, and/or an organic phosphite. These modified stabilizer systems preferably contain 85 percent to 95 percent by weight of an organotin carboxylate, 2.5 percent to 10 percent by weight of an organic disulfide or polysulfide, and 2.5 percent to 10 percent by weight of one or more of the aforementioned modifiers.

The thiodipropionic acid component of the modified stabilizer systems has the structural formula

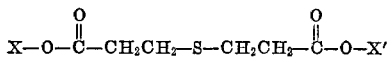

wherein X and X' each represents hydrogen, an alkyl group having from 4 to 20 carbon atoms, a hydroxyalkyl group having from 1 to 4 carbon atoms, an alkenyl group or a cycloalkyl group. These compounds include thiodipropionic acid, dibutyl thiodipropionate, dioctyl thiodipropionate, distearyl thiodipropionate, dieicosyl thiodipropionate, dicyclohexyl thiodipropionate, di(hydroxymethyl)thiodipropionate, di(hydroxybutyl)thiodipropionate, and di(oleyl)thiodipropionate.

The organic phosphites that may be used in the stabilizer mixtures include a wide variety of substituted and unsubstituted aliphatic and aromatic phosphites. They may be secondary phosphites, such as diaryl phosphites, aryl alkyl phosphites, and dialkyl phosphites, or tertiary phosphites, such as trialkyl phosphites, triaryl phosphites, dialkyl monoaryl phosphites, and monoalkyl diaryl phosphites. Also useful are cyclic phosphites derived from pentaerythritol and other neopentyl polyhydric alcohols. A preferred group of phosphites are the trialkyl, triaryl, dialkyl monoaryl phosphites, and monoalkyl diaryl phosphites in which the alkyl groups are straight-chain or branched-chain groups containing from 3 to 18 carbon atoms and preferably from 4 to 10 carbon atoms and the aryl groups are phenyl groups or substituted phenyl groups in which the substituents are halogen atoms, hydroxyl groups, or alkyl groups containing from 1 to 12 carbon atoms. Illustrative of these organic phosphites are the following: triphenyl phosphite, tri-(p-tert.butylphenyl)phosphite, tri - (hydroxyphenyl)phosphite, diphenyl monobutyl phosphite, diphenyl monododecyl phosphite, monophenyl di-2-ethylhexyl phosphite, di-(p-tert.-octylphenyl)mono-(2-ethylhexyl)phosphite, di - (nonylphenyl) mono-(2-chloroethyl)phosphite, mono(chlorophenyl) di-($\beta$-chlorobutyl)phosphite, tripropyl phosphite, trioctyl phosphite, tridodecyl phosphite, trioctadecyl phosphite, dioctadecyl monopropyl phosphite, dibutyl monododecyl phosphite, and the like. Another preferred group of phosphites are the secondary phosphites that contain the aforementioned aryl and/or alkyl groups. These include, for example, diphenyl phosphite, di(chlorophenyl)phosphite, octaphenyl octyl phosphite, di(nonylphenyl)phosphite, di - (dibutylphenyl)phosphite, phenyl octadecyl phosphite, dibutylphenyl dodecyl phosphite, dibutyl phosphite, di-2-ethylhexyl phosphite, and hexyl octyl phosphite. Also preferred are secondary phosphites resulting from the partial hydrolysis of any of the aforementioned tertiary phosphites. A single phosphite or a mixture of two or more of these compounds may be used in the halogenated polyolefin compositions.

Only a small amount of the stabilizer systems need be present in the stabilized vinyl halide resin compositions of this invention. As little as 1 percent of the stabilizer system, based on the weight of the vinyl halide resin, will bring about an appreciable improvement in the heat stability of the compositions. Ten percent or more of the stabilizer system can be used, but these larger amounts generally do not provide further improvement in the properties of the resinous compositions and for this reason are not ordinarily used. In most cases approximately 2 percent to 5 percent of the stabilizer system, based on the weight of the vinyl halide resin, gives most advantageous results.

The stabilizer systems of this invention are of particular value in the stabilization of rigid polyvinyl chloride compositions, that is, compositions which are formulated to withstand temperatures of at least 350° F. The novel stabilizer systems can also be used in plasticized vinyl halide resin compositions of conventional formulation where high softening point is not a requisite. The vinyl halide resins that may be employed in such compositions include both vinyl halide homopolymers, such as polyvinyl chloride, polyvinyl bromide, and polyvinylidene chloride, and copolymers formed by the polymerization of a vinyl halide with up to about 30 percent of a comonomer, such as vinyl acetate, vinyl propionate, vinylidene chloride, styrene, methyl methacrylate, ethylene, and the like. The invention is also applicable to mixtures of a vinyl halide resin in a major proportion with a minor proportion of another synthetic resin, such as chlorinated polyethylene, polyacrylate and polymethacrylate esters, polyacrylonitrile, and terpolymers of acrylonitrile, butadiene, and styrene. Any of the well-known plasticizers for vinyl halide resins can be used including dioctyl phthalate, dibutyl sebacate, tricresyl phosphate, and octyl diphenyl phosphate.

In addition to the ingredients described, the stabilized resinous compositions may contain other resin additives, such as pigments, dyes, processing aids, extenders, and lubricants, in the amounts ordinarily employed for the purposes indicated.

The stabilized vinyl halide resin compositions may be prepared by any convenient procedure. It is generally preferred to blend the stabilizer mixture with the vinyl halide resin using plastic mixing rolls at a temperature at which the mix is fluid and to mill the composition on a two-roll mill at from 300° F. to 400° F. for a time sufficient to form a homogeneous sheet. The plasticizer, if one is employed, and other additives may be incorporated with the stabilizer. The stabilized composition may then be removed from the mill in the form of a sheet or film of the desired thickness which may be used as such or subjected to a polishing or embossing treatment.

The invention is further illustrated by the examples that follow. In these examples all parts and percentages are parts by weight and percentages by weight.

EXAMPLE 1

To a mixture of 200 parts of polyvinyl chloride (Tenneco 200) and 0.2 part of wax was added a small amount of either a stabilizer of this invention or a comparative stabilizer. The wax component was made up of equal parts of synthetic long chain fatty acids partially saponified with calcium (Wax GL–3) and an ester of montan wax partially saponified with calcium (Wax OP). The mixtures were blended at room temperature and then charged to a two-roll, steam-heated mill whose surface was maintained at 340° F. The mixtures were milled for 5 minutes and then removed from the rolls as flexible, homogeneous sheets that were 35 to 45 mils in thickness.

The heat stability of the compositions was determined by placing 1 x 1 inch specimens that had been cut from the milled sheets in a forced-circulation oven at 375° F. and removing specimens periodically until substantial degradation had taken place as indicated by color change.

The stability of the compositions during processing was determined by working 60 grams of the compositions in a Brabender Plasticorder using a bowl temperature of 190° C. and a rotor speed of 30 r.p.m. until degradattion had taken place.

The stabilizers used and the stability of the resulting compositions are summarized in Table I.

TABLE I

| Stabilizer | | Amount of stabilizer (phr.) | Oven stability (minutes to degrade) | Brabender stability (minutes to degrade) |
|---|---|---|---|---|
| Ex. No.: | | | | |
| 1A | Dibutyltin maleate | 1.7 | 90 | 16 |
| | Di-tert.butyl disulfide | 0.3 | | |
| 1B | Dibutyltin maleate | 1.7 | 100 | 22 |
| | Di-tert.octyl disulfide | 0.3 | | |
| 1C | Dibutyltin maleate | 1.7 | 100 | 22 |
| | Di-tert.decyl disulfide | 0.3 | | |
| 1D | Dibutyltin maleate | 1.7 | 100 | 22 |
| | Di-dodecyl disulfide | 0.3 | | |
| 1E | Dibutyltin maleate | 1.7 | 100 | 23 |
| | Di-tert.tetradecyl disulfide | 0.3 | | |
| 1F | Dibutyltin maleate | 1.7 | 100 | 22 |
| | Di-n-hexadecyl disulfide | 0.3 | | |
| 1G | Dibutyltin maleate | 1.7 | 100 | 21 |
| | Dibenzyl disulfide | 0.3 | | |
| 1H | Dibutyltin maleate | 1.7 | 90 | 18 |
| | Di-tert.dodecyl polysulfide | 0.3 | | |
| 1I | Dibutyltin bis (monoisooctyl maleate) | 2.1 | 80 | 17.5 |
| | Di-tert.tetradecyl polysulfide | 0.4 | | |
| Comp. Ex.: | | | | |
| 1 | Dibutyltin maleate | 2.0 | 70 | 11.5 |
| 2 | Dibutyltin bis (isooctyl maleate) | 2.1 | 60 | 7.5 |

EXAMPLE 2

To a mixture of 80 parts of polyvinyl chloride (Tenneco 200), 20 parts of chlorinated polyethylene (Plaskon CPE 102), and 3.3 parts of epoxidized soybean oil was added 2 parts of either a stabilizer of this invention or a comparative stabilizer. The mixtures were blended at room temperature and then charged to a two-roll, steam-heated mill whose surface was maintained at 340° F. The mixtures were milled for 5 minutes and then removed from the rolls as flexible, homogeneous sheets that were 35 to 45 mils in thickness.

The heat stability of the compositions were determined by the procedures set forth in Example 1.

The stabilizers used and the stability of the resulting compositions are summarized in Table II.

TABLE II

| Stabilizer | | Amount of stabilizer (phr.) | Oven stability (minutes to degrade) | Brabender stability (minutes to degrade) |
|---|---|---|---|---|
| Ex. No.: | | | | |
| 2A | Dibutyltin bis (monopropyl maleate) | 1.8 | 70 | 11.75 |
| | Di-tert.tetradecyl disulfide | 0.2 | | |
| 2B | Dibutyltin bis (monopropyl maleate) | 1.9 | 70 | 12.25 |
| | Di-tert.tetradecyl disulfide | 0.1 | | |
| Comp. Ex.: | | | | |
| 3 | Dibutyltin bis (monopropyl maleate) | 2.0 | 50 | 6.25 |

EXAMPLE 3

To a mixture of 85 parts of polyvinyl chloride (Tenneco 200), 12 parts of an acrylonitrile-butadiene-styrene terpolymer (Blendex 401), 3 parts of acrylic ester resin (Acryloid K-120N), 0.1 part of Wax OP, and 0.1 part of Wax GL-3 was added either 2 parts of dibutyltin bis (monopropyl maleate) or a mixture containing 1.8 parts of dibutyltin bis (monopropyl maleate) and 0.2 part of di-tert.tetradecyl disulfide.

The compositions were prepared and evaluated by the procedures set forth in Example 1. In the Oven Stability test, both compositions had become light orange in color after 140 minutes at 350° F. In the Brabender Stability test, the composition containing the stabilizer system of this invention was degraded in 14.5 minutes, whereas the comparative composition, which contained only dibutyltin bis (monopropyl maleate) as stabilizer, reached the same level of degradation in 12.5 minutes.

EXAMPLE 4

To a mixture of 200 parts of polyvinyl chloride (Tenneco 200), 0.1 part of Wax GL-3, and 0.1 part of Wax OP was added 2 parts of either a stabilizer of this invention or a comparative stabilizer. The mixtures were blended at room temperature and then charged to a two-roll, steam-heated mill whose surface was maintained at 340° F. The mixtures were milled for 5 minutes and then removed from the rolls as flexible, homogeneous sheets that were 35 to 45 mils in thickness.

The Oven Heat stability of the compositions was determined by the procedure set forth in Example 1. Strips cut from the milled sheets were press-polished in a Watson-Stillman press at 350° F.

The stabilizers used and the properties of the resulting compositions are summarized in Table III.

TABLE III

| Stabilizer | | Amount of stabilizer (phr.) | Oven stability (minutes to degrade) | Color of pressed plaque |
|---|---|---|---|---|
| Ex. No.: | | | | |
| 4A | Dibutyltin bis (monopropyl maleate) | 1.9 | 80 | Waterwhite. |
| | Di-tert.tetradecyl disulfide | 0.05 | | |
| | Didecyl phenyl phosphite | 0.05 | | |
| 4B | Dibutyltin bis (monopropyl maleate) | 1.8 | 90 | Waterwhite. |
| | Di-tert.dodecyl disulfide | 0.1 | | |
| | Di(isocotyl) thiodipropionate | 0.1 | | |
| Comp. Ex. 4 | Dibutyltin bis (monopropyl maleate) | 2.0 | 60 | Light yellow. |

From the data in Tables I, II, and III it will be seen that the compositions containing the stabilizers of this invention had far better heat stability and processing stability (as shown by the Brabender Stability) than did the comparative compositions that contained only an organotin carboxylate as stabilizer.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A heat and light stable resinous compositions comprising a vinyl halide resin and 1 part to 10 parts by weight per 100 parts by weight of said vinyl halide resin of a stabilized system containing (a) 65 percent to 95 percent by weight of an organotin carboxylate selected from the group consisting of

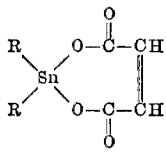

and

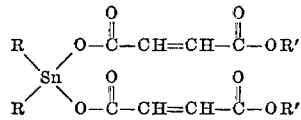

wherein each R represents an alkyl group having from 4 to 8 carbon atoms or phenyl and each R' represents an alkyl group having from 1 to 18 carbon atoms, an alkenyl group having from 4 to 18 carbon atoms, a hydroxyalkenyl group having from 4 to 18 carbon atoms, a cycloalkyl group, an alkaryl group, an aralkyl group, or phenyl and (b) 5 percent to 35 percent by weight of an organic sulfide having the structural formula

wherein $m$ represents a number that is at least 2 and R" and R''' each represents an alkyl group having 2 to 18 carbon atoms, a hydroxyalkyl group having 2 to 18 carbon atoms, an alkenyl group, an aralkyl group, or phenyl.

2. A heat and light stable resinous composition according to claim 1 that contains polyvinyl chloride and 2 parts to 5 parts by weight of said stabilizer system per 100 parts by weight of polyvinyl chloride.

3. A heat and light stable resinous composition according to claim 2 wherein the stabilizer system contains 85 percent to 95 percent by weight of said organotin carboxylate and 5 percent to 15 percent by weight of said organic sulfide.

4. A heat and light stable resinous composition according to claim 3 wherein the organotin carboxylate is dibutyltin maleate.

5. A heat and light stable resinous composition according to claim 3 wherein the organotin carboxylate is dibutyltin bis (monopropyl maleate).

6. A heat and light stable resinous composition according to claim 3 wherein the organic sulfide is di-tert.tetradecyl disulfide.

7. A heat and light stable resinous composition according to claim 3 wherein the organic sulfide is di-n-hexadecyl disulfide.

8. A heat and light stable resinous composition comprising polyvinyl chloride and 1 part to 10 parts by weight per 100 parts by weight of polyvinyl chloride of a stabilizer system containing (a) 85 percent to 95 perfent by weight of an organotin carboxylate selected from the group consisting of

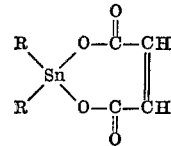

and

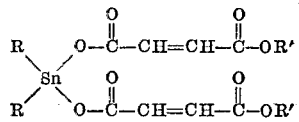

wherein each R represents an alkyl group having from 4 to 8 carbon atoms or phenyl and each R' represents an alkyl group having from 1 to 18 carbon atoms, an alkenyl group having from 4 to 18 carbon atoms, a hydroxyalkenyl group having from 4 to 18 carbon atoms, a cycloalkyl group, an alkaryl group, an aralkyl group, or phenyl; (b) 2.5 percent to 10 percent by weight of an organic sulfide having the structural formula

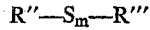

wherein $m$ represents a number in the range of 2 to 10 and R" and R''' each represents an alkyl group having 2 to 18 carbon atoms, a hydroxyalkyl group having 2 to 18 carbon atoms, an alkenyl group, an aralkyl group, or phenyl; and (c) 2.5 percent to 10 percent by weight of a stabilizer modifier selected from the group consisting of thiodipropionic acid, thiodipropionate esters, and mixtures thereof.

9. A heat and light stable resinous composition according to claim 8 wherein the organotin carboxylate is dibutyltin bis (monopropyl maleate).

10. A heat and light stable resinous composition according to claim 8 wherein the organic sulfide is di-tert.octyl disulfide.

11. A heat and light stable resinous composition according to claim 8 wherein the organic sulfide is di-tert.tetradecyl disulfide.

12. A heat and light stable resinous composition according to claim 8 wherein the stabilizer modifier is di-(isooctyl) thiodipropionate.

13. A stabilizer system for vinyl halide resin compositions that contains (a) 65 percent to 95 percent by weight of an organotin carboxylate selected from the group consisting of

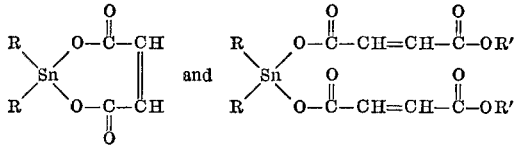 and 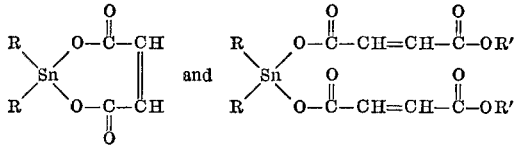

wherein each R represents an alkyl group having from 4 to 8 carbon atoms or phenyl and each R' represents an alkyl group having from 1 to 18 carbon atoms, an alkenyl group having from 4 to 18 carbon atoms, a cycloalkyl group, an alkaryl group, an aralkyl group, or phenyl and (b) 5 percent to 35 percent by weight of an organic sulfide having the structural formula

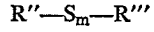

wherein $m$ represents a number that is at least 2 and R" and R''' each represents an alkyl group having from 2 to 18 carbon atoms, a hydroxyalkyl group having from 2 to 18 carbon atoms, an alkenyl group, an aralkyl group, or phenyl.

14. A stabilizer system according to claim 13 that contains 85 percent to 95 percent by weight of said carboxylate and 5 percent to 15 percent by weight of said organic sulfide.

15. A stabilizer system according to claim 13 wherein the organotin carboxylate is dibutyltin maleate.

16. A stabilizer system according to claim 13 wherein the organotin carboxylate is dibutyltin bis(monopropyl maleate).

17. A stabilizer system for vinyl halide resin compositions that contains (a) 85 percent to 95 percent by weight of an organotin carboxylate selected from the group consisting of

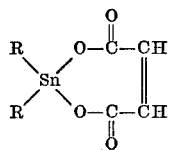

and

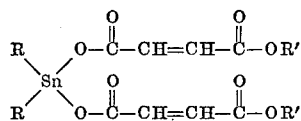

wherein each R represents an alkyl group having from 4 to 8 carbon atoms or phenyl and each R' represents an alkyl group having from 1 to 18 carbon atoms, an alkenyl group having from 4 to 18 carbon atoms, a hydroxyalkenyl group having from 4 to 18 carbon atoms, a cycloalkyl group, an alkaryl group, an aralkyl group, or phenyl; (b) 2.5 percent to 10 percent by weight of an organic sulfide having the structural formula

wherein $m$ represents a number that is at least 2 and R'' and R''' each represents an alkyl group having from 2 to 18 carbon atoms, a hydroxyalkyl group having from 2 to 18 carbon atoms, an alkenyl group, an aralkyl group, or phenyl; and (c) 2.5 percent to 10 percent by weight of a stabilizer modifier selected from the group consisting of thiodipropionic acid, thiodipropionate esters, and mixtures thereof.

18. A stabilizer system according to claim 17 wherein the organotin carboxylate is dibutyltin maleate.

19. A stabilizer system according to claim 17 wherein the organotin carboxylate is dibutyltin bis (monopropyl maleate).

20. A stabilizer system according to claim 17 wherein the organic sulfide is di-tert.octyl disulfide.

21. A stabilizer system according to claim 17 wherein the organic sulfide is di-tert.tetradecyl disulfide.

22. A stabilizer system according to claim 17 wherein the stabilizer modifier comprises di(isooctyl)thiodipropionate.

23. A stabilizer system according to claim 17 wherein the organic sulfide is di-tert.dodecyl disulfide.

References Cited

UNITED STATES PATENTS

| | | | |
|---|---|---|---|
| 2,564,646 | 8/1951 | Leistner | 260—45.7 |
| 3,297,629 | 1/1967 | Kauder | 260—45.75 |
| 3,417,039 | 12/1968 | Penneck | 260—23 |

DONALD E. CZAJA, Primary Examiner

V. P. HOKE, Assistant Examiner

U.S. Cl. X.R.

252—400, 406; 260—45.7, 45.85, 45.95